United States Patent [19]

McGinnis et al.

[11] Patent Number: 5,128,424
[45] Date of Patent: Jul. 7, 1992

[54] EPOXY RESIN, MERCATO CURING AGENT AND POLYSULFIDE ADDUCT

[75] Inventors: Vincent D. McGinnis, Sunbury, Ohio; Kazumi Nejigaki, Mie, Japan; Duryodhan Mangaraj, Dublin, Ohio

[73] Assignee: Japan Synthetic Rubber Co., Ltd., Tokyo, Japan

[21] Appl. No.: 732,078

[22] Filed: Jul. 18, 1991

[51] Int. Cl.⁵ .................... C08G 59/66; C08L 63/02; C08L 63/04
[52] U.S. Cl. .................... 525/481; 525/504; 525/505; 525/524; 525/533
[58] Field of Search ............... 525/528, 481, 504, 505, 525/524, 533

[56] References Cited

U.S. PATENT DOCUMENTS

| | | | |
|---|---|---|---|
| 3,101,326 | 8/1963 | Montesano et al. | 260/43 |
| 3,732,309 | 5/1973 | Garnish et al. | 260/583 |
| 3,882,091 | 5/1975 | Villa | 260/79 |
| 3,914,288 | 10/1975 | Garnish et al. | 560/127 |
| 4,017,554 | 4/1977 | Villa | 260/830 |
| 4,214,067 | 7/1980 | Packer | 525/523 |
| 4,317,757 | 3/1982 | Kooijmans et al. | 524/541 |
| 4,623,702 | 11/1986 | Grieves et al. | 525/528 |
| 4,689,389 | 8/1987 | Lee et al. | 528/109 |
| 4,707,518 | 11/1987 | Shah | 525/122 |
| 4,803,232 | 2/1989 | Shah | 523/456 |

FOREIGN PATENT DOCUMENTS

| | | |
|---|---|---|
| 54-10665 | 2/1979 | Japan . |
| 59-182817 | 10/1984 | Japan . |
| 59-232117 | 12/1984 | Japan . |
| 60-181123 | 9/1985 | Japan . |
| 61-148280 | 7/1986 | Japan . |
| 63-186727 | 8/1988 | Japan . |
| 7353298 | 11/1973 | United Kingdom . |
| 7437564 | 8/1974 | United Kingdom . |

Primary Examiner—Robert E. Sellers
Attorney, Agent, or Firm—Mueller and Smith

[57] ABSTRACT

Broadly, the present invention is directed to an adhesive composition which comprises an epoxy resin, an effective amount of a mercapto curing agent or curative for said epoxy resin, and a compatibilizing amount of a polysulfide compound which has a performance improving fraction of its —SH groups rendered unreactive with the epoxy groups in said composition. Optionally, the adhesive composition can contain amine or amide curing agents in addition to the mercapto curative. Advantageously, at least about 5% of the number of reactive thiol groups of the polysulfide compound are rendered unreactive, advantageously at least about 25%, and preferably at least about 50%. Preferred polysulfide compatibilizing compounds are adducts of a polysulfide and a component which contains functionality reactive with a thiol group, but which contains no residual functionality reactive with epoxy groups in the composition once the polysulfide adduct is formed. Another aspect of the present invention is a method for improving the performance of an adhesive composition of an epoxy resin and a mercapto curative, which method comprises incorporating a compatibilizing amount of polysulfide compound which has had a performance improving fraction of its —SH groups rendered unreactive with epoxy groups in the composition. The polysulfide compatibilizing adduct is formed by the reaction of a polysulfide and a component that contains functionality reactive with thiol groups, but which contains no residual functionality reactive with epoxy groups in the adduct.

18 Claims, No Drawings

EPOXY RESIN, MERCATO CURING AGENT AND POLYSULFIDE ADDUCT

BACKGROUND OF THE INVENTION

The present invention relates to structural engineering adhesive for bonding metal and fibrous-reinforced composite (e.g. sheet molding compounds (SMC), fiberglass reinforced polyesters (FRP), resin transfer molding (RTM), and the like) parts to a variety of similar and dissimilar substrates which find use in the manufacture of cars, trucks, boats, and a host of other products.

Sheet molding compound (SMC), for example, is defined (ASTM) as a molding compound in integral sheet form comprising a thermosetting resin, fibrous reinforcement, and additives required for processing or product performance, e.g., resin, catalyst, thickener, mold release agent, particulate filler, pigment, shrink control agent, etc. Fibrous reinforced polyester (FRP) comprises polyester thermosetting resins retaining fibrous reinforcement and conventional additives. These materials and others generally are known as fibrous-reinforced composites, reinforced composites, or simply composites.

One typical class of structural adhesives useful in adhering composite parts to the same and to diffeent substrates are two-part polyurethane adhesives. These adhesives are made by combining a prepolymer and a curative just before use. The ratio in which these materials are combined will vary depending upon the functionality of the prepolymer and the curative. Accurate combination of the materials requires a certain skill level of the worker and, unfortunately, there is substantial waste of adhesive during the mixing process even using automatic pumping equipment.

Another typical class of structural adhesives useful in adhering metal parts to the same and to different substrates (e.g. composites) are epoxy adhesives. Epoxy adhesive compositions typically contain a polyfunctional epoxy resin and are cured by addition of a curative which typically is provided in a separate package. The rate of cure and product characteristics are influenced by the choice of curing agent, which itself is influenced by the make-up of the adhesive composition, as dictated by the final properties desired by the user.

Structural adhesives are used by application to the surface of a part made of, e.g. metal, and positioning a surface of second part (of the same or different material) over the adhesively-covered metal surface. Since the parts often have uneven surfaces, it is desirable that the adhesive possess the ability to fill the resulting voids of varying depth. It is important that the adhesive remain uncured and fluid for sufficient time to permit placing of the second substrate into contact with the adhesive. An adhesive which hardens too quickly does not permit flexibility in the assembly line process. Thus, the length of time the adhesive is fluid is measured and is referred to as "open time". The adhesive may be cured by placing the adhered parts in an oven maintained at, e.g., 70°-190° C. for e.g., 5 minutes or less to cure or harden the adhesive, but preferably the adhesive may be cured by letting it stand at room temperature for one to several days, e.g. 3 days.

Representative epoxy structural adhesive compositions can be found in, for example, U.S. Pat. Nos. 4,707,518, 4,803,232, 4,623,702, 4,316,979, 3,101,326, 4,689,389, 3,882,091, and 4,017,554, the disclosures of which are expressly incorporated herein by reference.

Various combinations of epoxy resins, rubber modifiers, amine curing agents, amide curing agents, Lewis acids, mercaptan curing agents, etc. have been proposed for formulating high strength adhesive compositions. A major deficiency in these adeshives is that none has proven to contain an acceptable balance of (1) room temperature curing and rapid gel times, (2) high lap shear strength, (3) high T-peel strength (4) adhesion to oil contaminated surfaces, (5) attainment of full cure within a relatively short time period, and (6) resistance to water. It is to an adhesive composition that contains such acceptable balance of properties that the present invention is addressed.

BROAD STATEMENT OF THE INVENTION

Broadly, the present invention is directed to an adhesive composition which comprises an epoxy resin, an effective amount of a mercapto curing agent or curative for said epoxy resin, and a compatibilizing amount of a polysulfide compound which has a performance improving fraction of its terminal —SH groups (terminal —SH groups include pendent reactive —SH groups for present purposes) rendered unreactive with the epoxy groups in said composition. Optionally, the adhesive composition can contain amine or amide curing agents in addition to the mercapto curative. Advantageously, at least about 5% of the number of reactive thiol groups of the polysulfide compound are rendered unreactive, advantageously at least about 25%, and preferably at least about 50%. Preferred polysulfide compatibilizing compounds are adducts of a polysulfide and a component which contains functionality reactive with a thiol group, but which contains no residual functionality reactive with epoxy groups in the composition once the polysulfide adduct is formed. Another aspect of the present invention is a method for improving the performance of an ahdesive composition of an epoxy and a mercapto curative, which method comprises incorporating a compatibilizing amount of polysulfide compound which has had a performance improving fraction of its —SH groups rendered unreactive with epoxy groups in the composition. The polysulfide compatibilizing adduct is formed by the reaction of a polysulfide and a component that contains functionality reactive with thiol groups, but which contains no residual functionality reactive with epoxy groups in the adduct.

Advantages of the present invention include an adhesive composition which contains a balance of the following performance properties: room temperature cure and rapid cure times, high lap shear strength, high T-peel strength, adhesion to oil contaminated surfaces and alcohol wiped surfaces (e.g., aluminium, steel, SMC, etc.), resistance to water, and attainment of full cure within a relatively short period (e.g. 3 days at room temperature). Another advantage of the present invention is the ability to achieve such performance with a minimum alteration of the basic epoxy resin/mercapto curative composition, thus enabling the formulator to maintain other desirable properties including, for example, application viscosity, method of application, handling procedures, and the like. These and other advantages will be readily apparent to those skilled in the art based upon the disclosure contained herein.

DETAILED DESCRIPTION OF THE INVENTION

As the data will demonstrate, the inventive adhesive composition achieves an excellent balance of six different properties including room temperature cure; thin film gel times of less than 30 minutes; both high T-peel (e.g. 15-30 pli or lb/linear inch) and high lap shear value (e.g. at least about 1,000 psi); adhesion to alcohol-wiped aluminium, unclean surfaces, oil-contaminated surfaces, steel substrate, and SMC; water resistance; and through cure of complete cure (ability to reach high lap shear strength) within a relatively short time period, (e.g. three days at room temperature). In order to acheive the foregoing balance of properties, the adhesive compositions comprises an epoxy resin, a mercapto curative for the expoxy resin, and a polysulfide adduct which has a performance improving fraction of its thiol groups rendered unreactive with the epoxy groups in the composition.

Referring initially to the epoxy resin, a variety of monomeric and polymeric compounds or mixtures of compounds having an epoxy equivalency greater than 1 (i.e., wherein the average number of epoxy groups per molecule is greater than 1) can be used in formulating the inventive adhesives. Epoxy compounds are well-known as the art cited above details and which is expressly incorporated herein by reference. Useful epoxy compounds include, for example, polyglycidyl ethers of polyhydric polyols, such as ethylene glycol, triethylene glycol, 1,2-propylene glycol, 1,5-pentanediol, 1,2,6-hexanetriol, glycerol, and 2,2-bis(4-hydroxy cyclohexyl) propane; polyglycidyl ethers of aliphatic and aromatic polycarboxylic acids, such as, for example, oxalic acid, succinic acid, glutaric acid, terephthalic acid, 2,6-naphthalene dicarboxylic acid, and dimerized linoleic acid; polyglycidyl ethers of polyphenols, such as, for example, bis-phenol A, bis-phenol F, 1,1-bis(4-hydroxy phenyl) ethane, 1,1-bis(4-hydroxy phenyl) isobutane, and 1,5-dihydroxy naphthalene; and novolak resins; and the like and mixtures thereof.

The foregoing epoxy resins may be augmented with modified epoxy resins in the form of epoxy-rubber adducts. Such adducts are well known and include epoxy compounds reacted with liquid or solid butadiene-(meth)acrylonitrile copolymers having at least two groups which are reactive with epoxy groups, including, for example, carboxyl, hydroxyl, mercapto, and amino. Such functional elastomeric copolymers having functional groups are well-known articles of commerce and need not be discussed in greater detail herein.

Referring now to the mercapto curing agents, such curing agents reportedly having been based on mercapto alkyl esters of polycarboxylic acids, polythioglycolate esters, mercapto carboxylic acids, ester of mercapto carboxylic acids and glycols separated by a linear chain of at least 7 carbon atoms, the reaction product of NaSH and the condensate of a polyalkylene glycol and epichlorohydrin, organosilicon compounds which have SH groups, the reaction product of epoxidized dienes with hydrogen sulfide or alkyl mercaptans, hydrogen sulfide adducts of an epoxide and thiodipropanol, $H_2S$ adducts of a glycidyl ester of glycidyl ether of a dimerized fatty acid of alcohol, the reaction product of NaSH and a chlorohydrin ester or ether of dimerized acids or alochols, $H_2S$ or $NH_3$ adducts of a monoepisulfide, di- and trimercapto methyl diphenyl oxide, polyalkalene episulfides contain a thiol and an amino group, and tris(mercapto ethyl) trioxane. Such mercapto curing agents are available commercially as can be seen by reference to the examples. Additionally, the art cited in the Background contains much description of such mercapto curing agents. Further information can be found, for example, in *Epoxy Resins, Chemistry and Technology*, 2nd Ed., revised and expanded, edited by Clayton A. May, Marcell Dekker, Inc. (New York, N.Y., 1988). An effective amount of the mercapto curing agent for the epoxy resin in the adhesvie composition is used, as those skilled in this curing agent for the epoxy resin in the adhesive composition is used, as those skilled in this art will appreciate.

Referring to the polysulfide adduct, the polysulfide compounds also are exemplfied in the background art cited herein, and are available commercially. Polysulfide polymers typically contain two terminal —SH groups, though higher functionality polysulfides are known. The backbone can be composed of a variety of residual compoudns depending upon the synthesis procedure employed in making the polysulfide compounds. The epoxy/mercapto curing agent adhesive composition has its performance improved by the addition of the polysulfide compounds, as the art recognizes. What the art fails to recognize is that by rendering a performance improving fraction of the —SH groups unreactive with epoxy groups, the performance of the adhesive composition can be improved significantly. Such performance enhancing fraction means that at least about 5 wt-% of the polysulfide compound (i.e. at least 5% of the number of —SH groups, although for a non-mixed polysulifde compound weight-percent will be accurate) will be reacted with a compound which contains functionality unreactive with epoxy groups.

Advantageously, at least about 25% of polysulfide compound is formed into the adduct, and preferably at least 50% of a polysulfide compound is formed into the compatibilizing adduct of the present invention.

Since the polysulfide is terminated with —SH groups, a variety of functionality can be reacted with the active hydrogen atom. Suitable compounds for reacting with the polysulfide include, for example, epoxies (provided that the residual hydroxy group is sufficiently sterically hindered that it is unreactive with other epoxy groups), carboxylic acids, isocyanates, and the like, and mixtures thereof. The Examples will amplify on the formation of the compatibilizing adducts and their formation. The proportion should range from between about 5 and 50 percent by weight of the composition, preferably between about 10 and 40 percent by weight, in order to improve the properties of the resulting adhesive composition.

Optional ingredients in the adhesive composition include, for example, phosphine, polyamine, polyamidoamine, and polyamide catalyst and curing agents; particulate and reinforcing fillers and thixotropic agents, tinctorial pigments, opacifying pigments (e.g. $TiO_2$), and like conventional additives.

As noted above, the inventive adhesive composition is characterized by the achievement of a balance of properties including room temperature cure and rapid cure times, high lap shear strength, high T-peel strength, adhesion to oil contaminated surfaces, obtaining a full cure within a relatively short time period, and resistance to water. These characteristics will be illustrated in the examples. It should be noted that lap shear strength and T-peel strength are inconsistent properties for an adhesive to possess. That is, high lap shear strength normally is associated with harder resins while T-peel strength is associated with more rubbery resin. Thus, to achieve both high lap shear strength and high T-peel stength, while retaining the remaining performance properties, is a unique adhievement of the present invention that can be traced back to the use of the compatibilizing adducts.

The following examples show how the invention has been practiced, but should not be construed as limiting. In this application, all percentages and proportions are by weight and all units are in the metric system, unless otherwise expressly indicated. Also, all citations referred to herein are expressly incorporated herein by reference.

EXAMPLE 1

Two moles of glycidylpropyltrimethoxy silane (Dow Corning Z6040) were reacted with one mole of LP-3 polysulfide polymer (1,000 avg. MW, $n_D$ 1.5649, pour point $-26°$ C., flash point (PMCC)174° C., 2.0% cross-linking agent, Thiokol Chemcial Division, Trenton, N.J.) in 200 ml of refluxing methylene chloride over a 5 hour time period. The resulting solution was evaporated to 100% solids and IR analysis of the product indicated complete loss of the oxirane groups of the silane and of the —SH groups of the polysulfide polymer (Polysulfide Adduct 44763-66-29).

In a similar reaction, 2 moles of Cardura E ester (glycidyl ester of Versatic 911 Acid, Shell Chemical Company) and one mole of LP-3 polysulfide polymer were refluxed in 300 ml of methylene chloride for 6 hours, and the resulting product also was dried. IR analysis again showed that the thiol groups had been reacted and formed into nonreactive thioether groups (Polysulfide Adduct 44731-70).

EXAMPLE 2

In a reaction flask was placed 0.0542 moles of LP-3 polysulfide polymer, 0.11 moles of phenylisocyanate, 150 ml of methylene chloride, and 0.03 g of stannous octoate catalyst. This reaction mixture was refluxed for 7 hours and then cooled at room temperature overnight. The resulting yellow solution was placed on a rotary evaporation unit and the solvent was removed leaving a viscous yellow liquid (Adduct 44731-64-18). IR analysis indicated that all of the isocyanate groups had reacted and that all of the —SH groups also had been reacted.

A similar reaction product was made using phenyl isocyanate (2 moles) and one mole of LP-32 polysulfide polymer (4,000 avg MD, $n_D$ 1.5689, pour point 7° C., flash point (PMCC) 212° C., 0.5% cross-linking agent, Thiokol Chemical Division). Analysis of the product (Polysulfide Adduct 44731-68-27) showed that all of the thiol groups had been reacted and that there was not free phenyl isocyanate remaining in the product.

EXAMPLE 3

In syntheses like those described in Examples 1 and 2, additional Polysulfide Compatibilizers on adducts (44731-69-23) were formulated from phenylsilocyanate reacted with LP-32 polysulfide polymer (no residual —groups). Curable epoxy compositions then were formulated using polysulfides of varying —SH content, i.e., reactive mercapto or thiol groups. The formulations are set forth in Table 1, below:

TABLE 1

| Ingredient | Formulation 45071-82-(wt-parts) | | | | |
|---|---|---|---|---|---|
| | 1 | 2 | 3 | 4 | 5 |
| Epon 828* | 5.00 | 5.00 | 5.00 | 5.00 | 5.00 |
| LP-32 | — | 1.25 | 1.88 | 0.63 | 2.50 |
| 44731-69-23 | 2.50 | 1.25 | 0.63 | 1.88 | — |
| Capcure WR-6** | 3.68 | 3.68 | 3.68 | 3.68 | 3.68 |
| Gel Time (min) | 9 | 9 | 8 | 9 | 9 |

*Epon 828 epoxy resin, 185-192 epoxide equivalent, 384 MW, 11,000-15,000 cps. at 25° C., Shell Chemical Company.

**Capcure WR-6 is a pre-catalyzed mercaptan based epoxy hardener, Color (Gardner Hellige) 3, 174 mercaptan active hydrogen eq. wt., 1.06 sp gravity, viscosity (Brookfield, cp, 25° C.) <400, Henkel Corporation, Morristown, N.J.

Hardness testing (Shore D-2) then was initiated for each of the cured samples over a 24 hour time period following cure. Bonding of Al to Al coupons was used in all of the examples, unless otherwise indicated. The data recorded is set forth below in Table 2:

TABLE 2

| | Formulation (Shore D-2 Hardness) | | | | |
|---|---|---|---|---|---|
| Time (hrs) | 5 | 1 | 2 | 4 | 3 |
| 1 | 30.7 | 32.7 | 34.0 | 36.0 | 32.7 |
| 2 | 40.7 | 39.7 | 46.0 | 44.7 | 44.0 |
| 3 | 38.3 | 48.0 | 49.6 | 47.0 | 44.7 |
| 4 | 42.2 | 50.8 | 46.2 | 51.4 | 44.0 |
| 5 | 43.2 | 53.2 | 53.4 | 52.2 | 50.6 |
| 6 | 47.6 | 58.2 | 54.8 | 48.6 | 51.2 |
| 7 | 50.2 | 58.4 | 52.2 | 50.4 | 51.6 |
| 24 | 62.4 | 69.4 | 68.8 | 69.2 | 67.2 |

The above-tabulated data demonstrate the affect that the non-reactive adducts have in the epoxy/mercaptan adhesive system. Even at low levels, improvement in performance is seen. Based on the foregoing data, it apperars that at least 5 wt-% adduct will have a beneficial affect on performance. At 25%, the affect is quite noticeable, and at 50%, substantial improvement results.

EXAMPLE 4

Additional formulations containing various amounts of Polysulfide Compatibilizer 44731-68-27 (Example 2) were compounded and evaluated with respect of lap shear testing and T-peel testing. The following data was recorded:

TABLE 3

| Ingredient* | Formulation 45071-79-(wt-parts) | | | | |
|---|---|---|---|---|---|
| | B | A | C | H | G |
| Kelpoxy G202 | 2.50 | 2.50 | 2.50 | 2.50 | 2.50 |
| Epon 828 | 0.50 | 0.50 | 0.50 | 0.50 | 0.50 |
| Den 438 | 0.50 | 0.50 | 0.50 | 0.50 | 0.50 |
| Talc | 0.75 | 0.75 | 0.75 | 0.75 | 0.75 |
| LP-32 | — | 1.80 | — | — | 1.80 |
| 44731-68-27 | 1.91 | — | — | 1.91 | — |
| Capcure WR-6 | 2.21 | 2.21 | 2.21 | — | — |
| Capcure 3-800 | — | — | — | 2.25 | 2.25 |
| DMP-30 | — | — | — | 2.25 | 2.25 |
| Shear Test** Median psi | 1520 | 1490 | 350 | 520 | 400 |
| T-Peel Test*** | 39 | 39 | <1 | 13 | 8 |

TABLE 3-continued

| Ingredient* | Formulation 45071-79-(wt-parts) | | | | |
|---|---|---|---|---|---|
| | B | A | C | H | G |
| Mean pli | | | | | |

*Kelpoxy G202 is a liquid epoxy resin, specs. 99-100 wt-% solids, 150-250 poises @ 25° C., 1.12-1.14 sp. gravity (25° C./25° C.), 220-260 epoxide eq., Reichhold Chemicals
Epon 828 (see Example 3)
Den 438 is a epoxy resin, 176-181 epoxide eq. wt., 543 MW, 20,000-50,000 cps at 25° C., Dow Chemical Company, Midland, Mi.
Capcure WR-6 (see Example 3)
Capcure 3-800 is a tri-functional mercaptan-terminated liquid polymer, color (Gardner-Hellige) 1, 1.15 sp. gr., 270 mercaptan hydrogen eq. wt., 10,000-15,000 cp @ 25° C., Henkel Corporation, Morristown, N.J.
DMP-30 is 2,4,6-tris(dimethylaminomethyl)phenol, Rohm & Haas Corp.
**ASTM D2919 Durability of Adhesive Joint Statically Stressed in Shear by Tension Loading (1989)
***ASTM D1876 T-Peel Adhesion (1989)

The above-tabulated results demonstrate that for each of the Capcure formulations tested, the highest shear values were recorded for the adduct which had no reactive thiol groups. T-peel test results also showed the same rank. Thus, the unexpected, yet proven, superiority in using a polysulfide compatibilizer that has had its reactive thiol groups rendered unreactive with epoxy groups is demonstrated.

EXAMPLE 5

In order to demonstrate the superiority of rendering the thiol groups of the polysulfide polymer unreactive with epoxy groups, adducts of Epon 828 di-epoxide (see Example 3), and LP-3 and LP-32 polysulfide polymers (see Examples 1 and 3, respectively) were synthesized in accordance with U.S. Pat. No. 4,316,979 (Adducts 52-16 and 57-15, respectively). These reactive adducts were compared to unmodified LP-3 and LP-32 polysulfide polymers unmodified and modified with phenyl isocyanate (Adducts 64-18 and 68-27 of Example 2). The following results were recorded.

TABLE 4*

| | LP-3 Unmodified | LP-32 Unmodified | Epoxy Modified LP-3 | Epoxy Modified LP-32 | Phenyl Isocyanate Modified | |
|---|---|---|---|---|---|---|
| | | | | | LP-3 | LP-32 |
| Lap Shear | 1640 | 1160 | 1700 | 1200 | 1600 | 1500 |
| T-Peel | 0 | 30 | 0 | 0 | 28 | 38 |

*values are psi for Lap shear and pli for T-Peel

These results demonstrate that for a balance of performance properties, the polysulfide adduct should have its thiol groups rendered unreactive, such as with phenyl isocyanate, rather than in reactive thiol form or in reactive epoxy form. While the lap shear performance was about equal for the adducts elevated, the T-peel performance of the inventive adducts clearly was superior to the reactive adducts evaluated.

EXAMPLE 6

In order to demonstrate the outstanding water resistance of the inventive adhesive composition, the non-reactive adducts of the present invention were compared against two different unmodified polysulfide polymers. The formulations tested and the results recorded are set forth below.

TABLE 5

| Ingredient | Formulation 45071-7-(wt-parts) | | |
|---|---|---|---|
| | A | B | C |
| Kelpoxy G202 | 2.50 | 2.50 | 2.50 |

TABLE 5-continued

| Ingredient | Formulation 45071-7-(wt-parts) | | |
|---|---|---|---|
| | A | B | C |
| Den 438 | 0.50 | 0.50 | 0.50 |
| Epon 828 | 0.50 | 0.50 | 0.50 |
| LP-32 | 1.80 | — | — |
| LP-31* | — | 1.80 | — |
| 44731-68-27 | — | — | 1.91 |
| Talc | 0.75 | 0.75 | 0.75 |
| Capcure WR-6 | 2.08 | 2.12 | 2.21 |
| Gel Time-Cup (min) | 16 | 13 | 16 |
| Gel Time-Film (min) | 28 | 23 | 27 |
| Shear Test Median psi | 1780 | 1760 | 1730 |
| Shear Water Test-14 Days at 40° C. | | | |
| Median psi | 820 | 920 | 980 |
| % psi retained | 46 | 52 | 57 |

*LP-31 liquid polysulfide, 8,000 avg. MW, $n_D$ 1.5728, pour point 10° C., flash point 225° C., 0.5% cross-linking agent, Thiokol Chemical Division.

The above-tabulated results demonstrate that the gel times for all three systems were under 30 minutes and that the initial lap shear values were similar for all three systems. Of prime importance, however, is that after 14 days of water immersion the non-reactive adduct of the present invention had a higher degree of strength retention.

EXAMPLE 7

Lap shear and T-peel testing of the modified inventive adduct compared to its unmodified form again was evaluated along with a system containing no polysulfide polymer. The formulations tested were compounded like those in Tables 3 and 5 using the curative noted. The results recorded are set forth below:

TABLE 6

| Curing Agent | LP-32 | 44731-68-27 | No Lp-32 |
|---|---|---|---|
| Lap Shear (psi) | | | |
| Capcure WR-6 | 1490 | 1520 | 350 |
| Capcure 3-800 | 400 | 520 | 500 |
| T-Peel (pli) | | | |
| Capcure WR-6 | 39 | 39 | <1 |
| Capcure 3-800 | 8 | 13 | 16 |

The above-tabulated results again demonstrate the improved overall balance of performance properties achieved using the unreactive modified polysulfide adducts or compatibilizers of the present invention. Also demonstrated is the effect which any polysulfide, modified or unmodified, displays in the basic adhesive formulation.

EXAMPLE 8

Mechanical performance properties of several inventive adducts were evaluated and compared to an unmodified polysulfide. The formulations were like those in Tables 3 and 5 using the Capcure WR-6 curative. The following results were obtained.

TABLE 7

| Test No. | Test | LP-3 | LP-3 Adduct | LP-3 Adduct No. |
|---|---|---|---|---|
| 44753-66 | 3 Day Shear (psi) | 600 | 700 | 64-18 (Example 2) |
| | T-Peel (pli) | 22.8 | 45.7 | |
| 44753-63 | 3 Day Shear (psi) | 500 | 680 | 66-29 (Example 1) |
| | T-Peel (pli) | 24 | 28.4 | |
| 44753-58 | Shear (psi) | 860 | 1580 | 64-18 (Example 2) |
| 44753-75 | 3 Day Shear (psi) | 800 | 980 | 70-16* |
| | T-Peel (pli) | Poor | 29.6 | |
| | 3 Day Shear (psi) | Poor | 1020 | 71-13* |

TABLE 7-continued

| Test No. | Test | LP-3 | LP-3 Adduct | LP-3 Adduct No. |
|---|---|---|---|---|
| | T-Peel (pli) | Poor | 27.8 | |

*Both are LP3/Cardura E adducts like 44731-70 of Example 1.

The anove-tabulated results again demonstrate the improved mechanical performance properties garnered by use of the inventive compatibilizer adducts of the present invention.

EXAMPLE 9

Additional testing of two of the adducts was undertaken in order to demonstrate the advantageous properties realized by their use. The results recorded are set forth below.

TABLE 8

| Test No. | Test* | LP-32 | LP-32 Adduct | LP-32 Adduct No. |
|---|---|---|---|---|
| 44753-72 | 3 Day Shear (psi) | 1160 | 1470 | 68-27 (Example 2) |
| | 14 Day Water Test % Retention | 36 | 40 | |
| | 17 Days Shear (psi) | 1520 | 1490 | |
| | 17 Day Water Test % Retention | 28 | 34.2 | |
| 44753-66 | T-Peel (IPA, pli) | 20.8 | 25.5 | 68-27 (Example 2) |
| | T-Peel (Alco, pli) | 30.6 | 37.6 | |
| 44753-91 | 3 Day Shear (psi) | 1040 | 890 | 68-27 (Example 2) |
| | T-Peel (Alco. pli) | 22.6 | 37.5 | |
| 45071-7 | 3 Day Shear (psi) | 1780 | 1730 | 68-27 (Example 2) |
| | 14 Day Water Test Shear (psi) | 820 | 980 | |
| | 14 Day Water Test % Retention | 46.1 | 56.6 | |
| 45071-79 | 3 Day Shear (psi) | 1490 | 1520 | 68-27 (Example 2) |
| | T-Peel (Alco, pli) | 39 | 39 | |
| 45071-79 | 3 Day Shear (psi) | 400 | 520 | 68-27 (Example 2) |
| | T-Peel (pli) | 8.1 | 12.7 | |
| 45753-91 | 3 Day Shear (psi) | 890 | 890 | 64-18 (Example 2) |
| | T-Peel (pli) | Poor | 23.2 | |

*IPA is isopropyl alcohol which was used to wipe down the Al panels.
Alco is Alconox surfactant which was used to wipe down the Al panels. Alconox being a biodegradable detergent (7.3 wt-% phosphorus). Alconox, Inc. (New York, New York), distributed by Fisher Scientific (Pittsburgh, Pa.)

These data again demonstrate the improved properties that the inventive adhesive has and its ability to develop strong adhesion to a mild cleaning (e.g. isopropyl alcohol and Alconox surfactant) of the aluminum substrate surface.

EXAMPLE 10

In order to demonstrate the rate of cure that is achieved by using the unreactive modified compatibilizer adducts of the present invention, lap shear data was developed as a function of time. The following data was recorded.

TABLE 9

| Formulation (44753-72) | Lap Shear Strength (psi) After 3 Days RT | Lap Shear Strength (psi) After 14 Days RT | Lap Shear Strength (psi) After 14 Days Water Immersion |
|---|---|---|---|
| LP-3 | 780 | 1260 | 380 |
| LP-2* | 1130 | 1380 | 440 |
| LP-32 | 1160 | 1500 | 420 |
| Adduct 68-27 | 1500 | 1500 | 510 |

TABLE 9-continued

| Formulation (44753-72) | Lap Shear Strength (psi) After 3 Days RT | Lap Shear Strength (psi) After 14 Days RT | Lap Shear Strength (psi) After 14 Days Water Immersion |
|---|---|---|---|
| (Example 2) | | | |

*LP-2 liquid polysulfide. 4,000 avg. MW, pour point 7° C., flash point 208° C., 2.0% cross-linking agent. Thiokol Chemical Division.

The above-tabulated results demonstrate that the formulations containing the inventive adduct, developed a higher initial cure (faster cure rate) and maintained such cure development at 14 days. Additionally, the inventive formulation retained a higher percent of its shear strength after being immersed in water for 14 days (i.e., 34% retention versus 28%. for the same polysulfide polymer, LP-32, in unmodified form).

EXAMPLE 11

In order to demonstrate adhesion to oily surfaces comparative and inventive formulations were compounded and evaluated on clean and oily aluminum panels (AL-38 naphthenic oil, Idemitsu Kosan Co., Ltd., Japan).

TABLE 10

| Ingredient | Comparative (wt-pts) | Inventive (wt-pts) |
|---|---|---|
| Kelpoxy G202 | 20 | 10 |
| Den 438 | 10 | 10 |
| Epon 828 | 20 | 20 |
| Kelpoxy G272* | 25 | 10 |
| Capcure WR-6 | 25 | 25 |
| 44731-68-27 | — | 25 |
| Lap Shear (psi) | | |
| Clean Al Panel | 1600 | 1600 |
| Oil-Dipped Al Panel | 600 | 1580 |

Kelpoxy G272 is reported to be an epoxy concentrate containing 40% of a carboxy terminated acrylonitrile rubber. Reichhold Chemicals.

These results demonstrate that the inventive adhesive formulation containing the unreactive polysulfide adduct retained adhesion to the oil panel much better than did the comparative formulation devoid of the adduct.

We claim:

1. An adhesive composition which comprises:
   (a) an epoxy resin:
   (b) an effective amount of a mercapto curing agent for said epoxy resin other than the polysulfide adduct; and
   (c) a compatibilizing amount of a polysulfide adduct which has a performance improving fraction of its terminal —SH groups rendered unreactive with epoxy groups in said composition, said adduct comprising the reaction product of a polysulfide compound and a component containing functionality reactive with —SH.

2. The adhesive composition of claim 1 wherein said performance improving fraction comprises at least 5% of its —SH groups.

3. The adhesive composition of claim 2 wherein at least about 50% of said —SH groups are rendered unreactive.

4. The adhesive composition of claim 1 wherein said adduct contains no groups reactive with said epoxy resin.

5. The adhesive composition of claim 4 wherein said functionality of said component is one or more of epoxy, carboxy and isocyanate.

6. The adhesive composition of claim 4 wherein said component comprises phenyl isocyanate.

7. The adhesive composition of claim 1 wherein said compatibilizing amount of said adduct ranges from between about 5 and 50% by weight of said composition.

8. The adhesive composition of claim 7 wherein the amount of said adduct ranges from between about 10 and 40% by weight of said composition.

9. The adhesive composition of claim 1 wherein said epoxy resin (a) is selected from the group consisting of polyglycidyl ethers of polyhydric polyols, selected from one more of ethylene glycol, triethylene glycol, 1,2-propylene glycol, 1,5-pentnediol, 1,2,6-hexanetriol, glycerol, and 2,2-bis(4-hydroxy cyclohexyl) propane; polyglycidyl ethers of aliphatic and aromatic polycarboxylic acids, selected from one or more of oxalic acid, succinic acid, glutaric acid, terephthalic acid, 2,6-naphthalene dicarboxylic acid, and dimerized linoleic acid; polyglycidyl ethers of polyphenols, selected from one or more of bis-phenol A, bis-phenol F, 1,1-bis(4-hydroxy phenyl) ethane, 1,1-bis(4-hydroxy phenyl) isobutane, and 1,5-dihydroxy napthalene; novolak resins; and mixtures thereof.

10. A method for making an adhesive composition which comprises blending the following ingredients:
    (a) an epoxy resin:
    (b) an effective amount of a mercapto curing agent for said epoxy resin other than the polysulfide adduct and
    (c) a compatibilizing amount of a polysulfide adduct which has a performance improving fraction of its terminal —SH groups rendered unreactive with epoxy groups in said composition, said adduct comprising the reaction product of a polysulfide compound and a component containing functionality reactive with —SH.

11. The method of claim 10 wherein said performance improving fraction comprises at least about 5% of its —SH groups.

12. The method of claim 11 wherein at least about 50% of said —SH groups are rendered unreactive.

13. The method of claim 10 wherein said adduct contains no groups reactive with said epoxy resin.

14. The method of claim 13 wherein the functionality of said component is one or more of epoxy, carboxy, and isocyanate.

15. The method of claim 13 wherein said componentt comprises phenyl isocyanate.

16. The method of claim 10 wherein said compatibilizing amount of said adduct ranges from between about 5 and 50% by weight of said composition.

17. The method of claim 16 wherein said adduct ranges from about 10 and 40% by weight of said composition.

18. The method of claim 10 wherein said epoxy resin (a) is selected from the group consisting of polyglycidyl ethers of polyhydric polyols, selected from one more of ethylene glycol, triethylene glycol, 1,2-propylene glycol, 1,5-pentanediol, 1,2,6-hexanetriol, glycerol, and 2,2-bis(4-hydroxy cyclohexyl) propane; polyglycidyl ethers of aliphatic and aromatic polycarboxylic acids, selected from one more of oxalic acid, succinic acid, glutaric acid, terephthalic acid, 2,6-naphthalene dicarboxylic acid, and dimerized linoleic acid, polyglycidyl ethers of polyphenols, selected from one or more of bis-phenol A, bis-phenol F, 1,1-bis(4-hydroxy phenyl) ethane, 1,1-bis(4-hydroxy phenyl) isobutane, and 1,5-dihydroxy naphthalene; (novolak resins; and mixtures thereof.

* * * * *